United States Patent
Cooley

(10) Patent No.: US 7,817,591 B2
(45) Date of Patent: Oct. 19, 2010

(54) DEDICATED LOCAL INTERNET RADIO

(75) Inventor: David M. Cooley, Slatington, PA (US)

(73) Assignee: Agere Systems Inc., Allentown, PA (US)

( * ) Notice: Subject to any disclaimer, the term of this patent is extended or adjusted under 35 U.S.C. 154(b) by 1144 days.

(21) Appl. No.: 10/645,961

(22) Filed: Aug. 22, 2003

(65) Prior Publication Data

US 2005/0041641 A1 Feb. 24, 2005

(51) Int. Cl.
*H04Q 7/00* (2006.01)
*H04J 3/26* (2006.01)

(52) U.S. Cl. .................................. 370/328; 370/432

(58) Field of Classification Search ............... 370/437, 370/433, 432, 336, 335, 329, 441; 709/201–203, 709/217–219; 455/412.1, 3.04, 3.03, 412.2
See application file for complete search history.

(56) References Cited

U.S. PATENT DOCUMENTS

| | | | | |
|---|---|---|---|---|
| 4,765,753 A | * | 8/1988 | Schmidt | 370/332 |
| 5,136,612 A | * | 8/1992 | Bi | 370/342 |
| 5,819,160 A | * | 10/1998 | Foladare et al. | 455/45 |
| 6,246,672 B1 | | 6/2001 | Lumelsky | 370/310 |
| 6,249,810 B1 | | 6/2001 | Kiraly | 709/217 |
| 6,343,255 B1 | | 1/2002 | Peek et al. | 702/3 |
| 6,389,463 B2 | | 5/2002 | Bolas et al. | 709/219 |
| 6,418,138 B1 | | 7/2002 | Cerf et al. | 370/352 |
| 6,456,234 B1 | * | 9/2002 | Johnson | 342/357.09 |
| 6,546,421 B1 | | 4/2003 | Wynblatt et al. | 709/225 |
| 6,546,427 B1 | | 4/2003 | Ehrlich et al. | 709/231 |
| 6,993,290 B1 | * | 1/2006 | Gebis et al. | 455/45 |
| 7,110,720 B1 | * | 9/2006 | Henderson | 455/66.1 |
| 2002/0061073 A1 | * | 5/2002 | Huang et al. | 375/295 |
| 2002/0107016 A1 | * | 8/2002 | Hanley | 455/426 |
| 2002/0152278 A1 | * | 10/2002 | Pontenzone et al. | 709/217 |
| 2003/0092427 A1 | * | 5/2003 | Uematsu et al. | 455/412 |

(Continued)

OTHER PUBLICATIONS

Baier, "Tolopogies of Difference: Mapping the Emergence of a Virtual Audio Community," *Society for Ethnomusicology-Midwest & Music theory Midwest Joint Annual Conference* (Apr. 2001).

(Continued)

*Primary Examiner*—Hong Cho
(74) *Attorney, Agent, or Firm*—Mendelsohn, Drucker & Associates, P.C.; David L. Cargille; Steve Mendelsohn

(57) ABSTRACT

A dedicated wireless data connection to the Internet through which digital broadcasts are streamed to mobile devices specifically designed to receive and play the content of the broadcasts. A user is supplied with a hand-held mobile terminal device specifically designed for the reception and playback of Internet radio wirelessly and the content available to the user of the device is automatically pre-specified based upon the connection node with which the device is currently communicating. The device creates and maintains a wireless connection to the Internet through any existing access technology (e.g., cellular or Wi-Fi access technology), manages the connection, including roaming, and buffers data in order to present a continuous stream of content to the end-user. Using this model, local advertisers and/or stations can pay the wireless service provider to have their content broadcast in a particular region, thereby enabling regional advertising to be delivered to listeners.

14 Claims, 4 Drawing Sheets

U.S. PATENT DOCUMENTS

2004/0028006 A1* 2/2004 Kayama et al. ............. 370/320
2005/0140499 A1* 6/2005 Lund ........................ 340/7.28
2005/0232140 A1* 10/2005 Proctor et al. ............... 370/208

OTHER PUBLICATIONS

Bedell, D., "Audiences sift through the vast choices of Internet radio," http://www.dougbedell.com/internetradio2001.html (Aug. 2001).

Deshpande and Gilbert, "GPRS-How Does It Work and How Good Is It?", *Intel Developer UPDATE Magazine*, pp. 1-5 (Oct. 2002).

"Service for Wireless Internet Access," Mobile Broadcast Network, http://www.mymbn.com/mbnserviceother.jsp (2002).

Beller, D., "How Internet Radio Works," Howstuffworks, http://computer.howstuffworks.com/internet-radio.htm/printable, pp. 1-3 (1998-2003).

Tyson, J., "How Wireless Internet Works," Howstuffworks, http://computer.howstuffworks.com/wireless-internet.htm/printable, pp. 1-6 (1998-2003).

Sempere, J.G., "An overview of the GSM system," *IEEE Vehicular Technology Society*, pp. 1-33, http://www.comms.eee.strath.ac.uk/~gozalvez/gsm/gsm.html (printed Nov. 21, 2003).

"Capacity in a Cellular System," *Monitoring Times*, pp. 1-4, http://www.decodesystems.com/mt/97feb/ (Feb. 1997)

Sari et al., "On the capacity of cellular CDMA and TDMA over non-dispersive channels," http://heloise.rug.ac.be/~hs/full/j06.pdf (no date).

\* cited by examiner

DEDICATED LOCAL INTERNET RADIO

FIELD OF THE INVENTION

This invention relates to the transmission of data to a wireless hand-held device, and more particularly, to dedicated Internet access via a cellular network for the purpose of receiving Internet radio.

BACKGROUND OF THE INVENTION

Radio broadcasting began in the 1920's and was originally available via a fixed receiver that would plug into AC house current and that would typically sit on a table or other piece of furniture in a non-portable fashion. In 1954, the transistor radio was introduced providing listeners with portable receiver capability in the form of a compact device that could be carried in a pocket. Using the transistor radio, a listener could listen to radio broadcasts virtually anywhere as long as they were within range of the radio transmitter and had a battery power source.

In the 1990's, with the growth of the Internet, music and other broadcasts became available over the Internet via a personal computer. With Internet radio, audio is delivered over the Internet via streaming media. Streaming media is a continuous broadcast that works through three software elements: an encoder, a server, and a player. The encoder converts audio content into a streaming format, the server makes it available over the Internet, and the player retrieves the content. For a live broadcast, the software elements work together in real time. An audio feed runs to the sound card of the computer or other device running the encoder software at the broadcast location and the stream is uploaded to the streaming server. A player retrieves the content from the streaming server and plays the content via a sound card or other hardware designed for the purpose of playing back the content.

Because the content is delivered via the Internet, Internet radio does not have geographic limitations such as those imposed by the broadcast range of a conventional radio broadcast. For example, using Internet radio, a broadcaster in Tokyo can be heard in Philadelphia over the Internet.

As people have become increasingly more mobile, devices have been developed that are able to access the Internet via the existing cellular networks. Some PDAs and web-enabled cell phones include features that enable them to be used to access email, download MP3 files and perform, in a mobile fashion, other operations that are typically performed from a desktop PC. Some have even developed devices whose primary function is to act as a receiving device for Internet radio "broadcasts" (as opposed to a telephone that has the ability to access Internet radio).

While the above systems are able to provide users with the ability to receive Internet radio via a portable device, all of the technology known to the applicant deliberately makes use of the ability to "receive" Internet broadcasts from around the world and, indeed, touts this ability as a selling point. While this may be fine for some, the typical user of a portable radio is often interested in receiving broadcasts local to the area in which they are situated. While this expectation may be based upon the limitations of typical broadcast radio, nonetheless, many users of these portable radios will not wish to be bothered with determining whether to listen to one of thousands of stations from Europe or places located a long distance from their current location; rather, they may be interested in local news, sports, weather, etc. and thus wish to simply turn on their radio and receive local broadcasts. No such systems exist in the prior art that provide this ability.

Accordingly, it would be desirable to have a method for providing portable automatic access to digital "broadcast" content available on the Internet, specifically Internet radio that plays a discreet segment of the available content, such as only content that is "local" to the proximity of a wireless device configured to receive these broadcasts, based on the location of the device at any given time.

SUMMARY OF THE INVENTION

In one embodiment, the present invention comprises a dedicated wireless data connection to the Internet (e.g., via cellular access technologies) through which digital broadcasts may be streamed to mobile devices specifically designed to receive and play the content of the broadcasts. In this embodiment, the invention utilizes a hand-held mobile terminal device specifically designed for the reception and playback of Internet radio wirelessly and, in accordance with this embodiment of the present invention, the content available to the user of the device is automatically pre-specified based upon the connection node (e.g., a cellular base station) with which the device is currently communicating. The device creates and maintains a wireless connection to the Internet through any existing access technology (e.g., cellular or Wi-Fi access technology), manages the connection, including roaming, and buffers data in order to present a continuous stream of content to the end-user. Thus, for example, the hand-held mobile terminal device of this embodiment of the present invention can receive Internet radio "broadcasts" from the Philadelphia region when connected to a communication node serving the Philadelphia area, and will receive Chicago area "broadcasts" when connected to a communication node local to the Chicago area. Using this model, local advertisers and/or stations can pay the wireless service provider to have their content broadcast in a particular region, thereby enabling regional advertising to be delivered to listeners. The user of the device can switch from station to station within the area using pre-set buttons or other designation means, with the specific broadcast to be associated with the pre-sets dictated by the local communication node.

In a preferred embodiment, the device is small, similar in nature to prior art "transistor radios" and utilizes an intuitive user interface with which to select "stations", control volume and other device operations.

DETAILED DESCRIPTION OF THE PREFERRED EMBODIMENT

Figure 1:
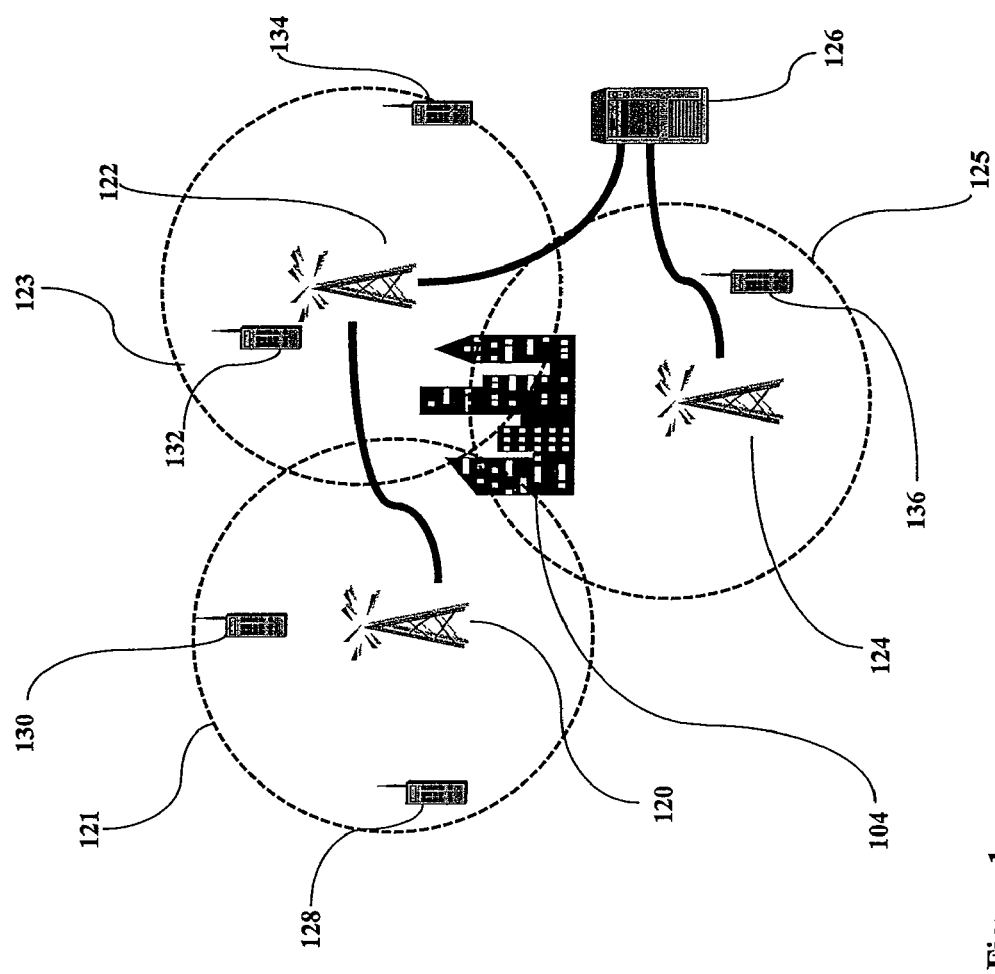
FIG. 1 illustrates the overall system and general environment of the present invention.
Figure 1:
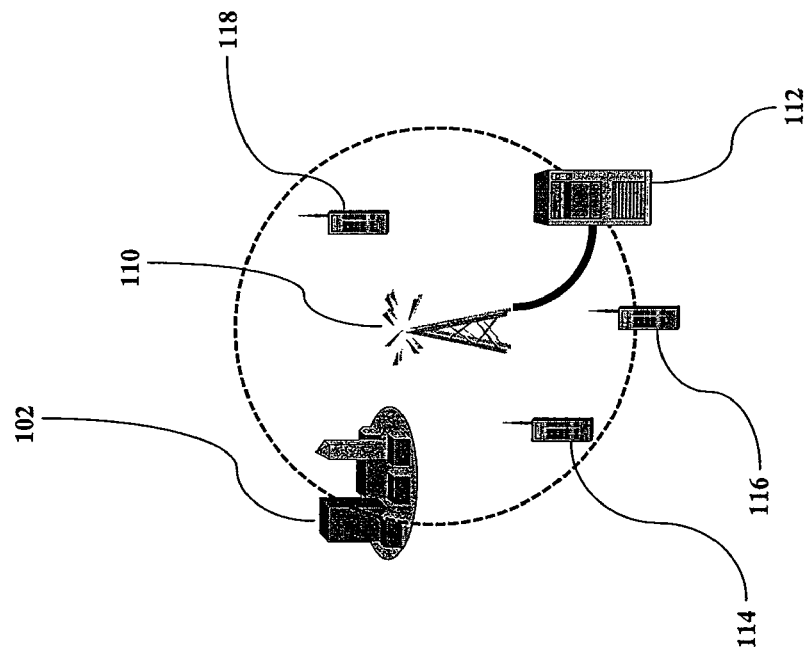

FIG. 1 illustrates the overall system and general environment of one embodiment of the present invention. Referring to FIG. 1, a first city 102 and second city 104 are illustrated. These cities could represent any cities, for example, adjacent cities in the same state, one city on the East Coast and one city on the West Coast, or two cities on different continents.

City 102 is located in the proximity of a cellular tower 110 (also called a connection node). In this example, the cellular system comprises a CDMA cellular system. As is well known, in a CDMA cellular system the RF space is divided into relatively large channels. Many phone conversations and/or data streams share each channel. Differentiating between the streams of data/conversations is made using a unique spreading code per each stream, thus allowing multiple "webcasts" to be delivered on a single channel. Each webcast is analogous to a "station" in traditional radio parlance.

As illustrated in FIG. 1, cellular tower 110 is logically coupled to a server 112. The server 112 is associated with a content provider and is the source (via a standard internet connection, for example) for the content that will be made available to listeners via cellular tower 110. In accordance with this embodiment of the present invention, the content provider who controls server 112 can lease at least one RF band on the cellular radio tower 110. This enables the content provider to deliver several "stations" (e.g., 20 to 40 stations, depending upon the basic operation of a particular CDMA cell). Each "station" has a unique spreading code and thus is separately "tuneable".

The broadcast area served by cellular tower 110 is illustrated by the dotted circle 111. Shown within the broadcast range 111 are hand-held mobile terminal devices 114, 116, and 118. These devices are dedicated devices that can receive RF cell transmissions and also, in a preferred embodiment, transmit back to the RF cell transmitter when desired.

Figure 2:
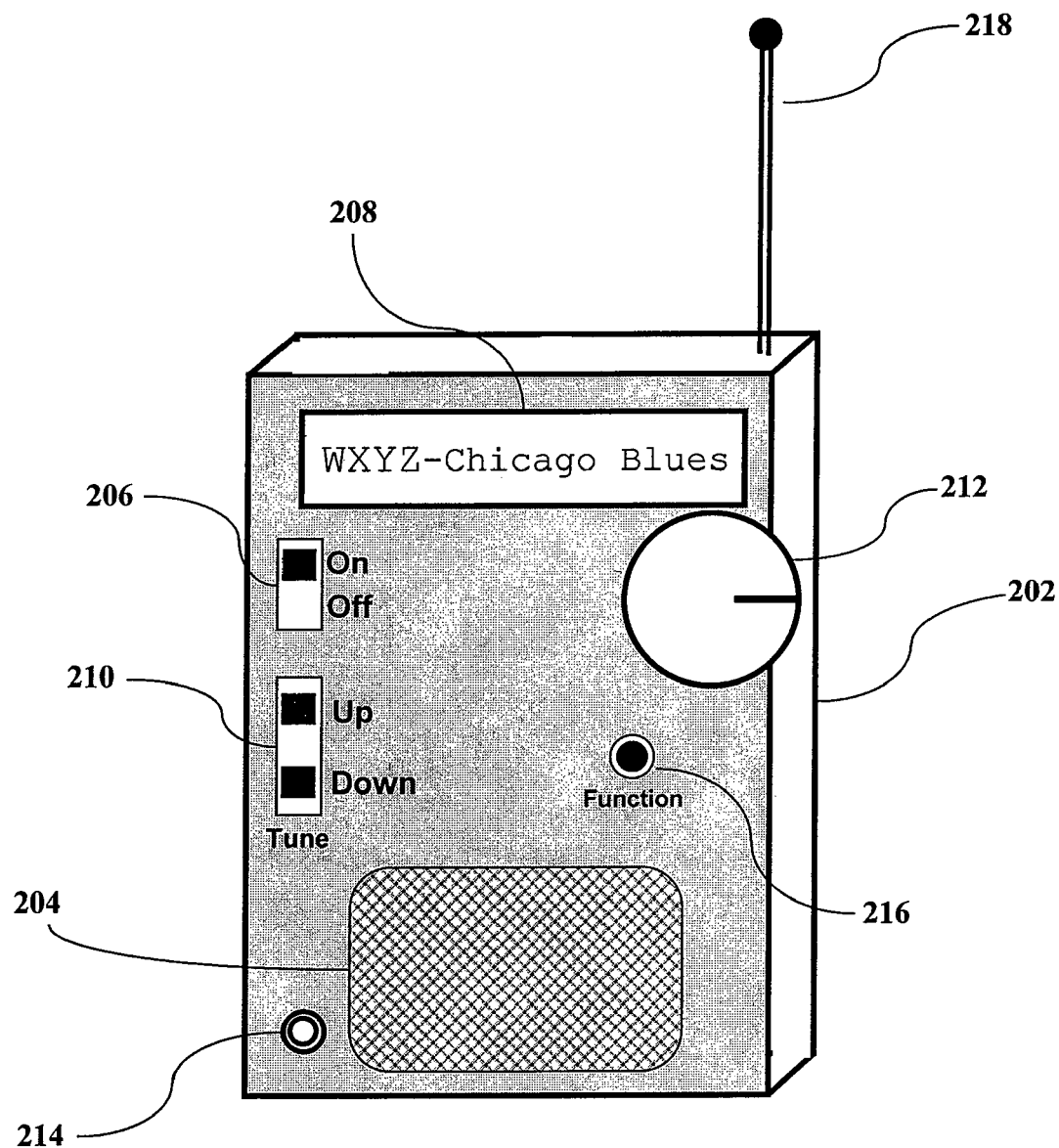
FIG. 2 illustrates an example of the overall structure of a hand-held mobile terminal device in accordance with the present invention.

FIG. 2 illustrates an example of the overall structure of a hand-held mobile terminal device in accordance with one embodiment of the present invention. It is understood that the example in FIG. 2 is merely an illustration that shows the functional elements that would be found in any hand-held mobile terminal device in accordance with this embodiment of the present invention and the present invention is not limited to the configuration illustrated therein. Referring to FIG. 2, a hand-held mobile terminal device 202 comprises a housing which houses a speaker 204, on-off switch 206, display 208, tuning control 210, volume control 212, a headphone jack 214, and interactive function button 216. An antenna 218 is provided to increase the reception available by the device in a well-known manner.

The speaker 204, on-off switch 206, tuning control 210, volume control 212, and headphone jack 214 all function essentially the same as they do on standard radio devices. The interactive function button 214 gives the user the ability to input function commands such that they are uploaded to the server to cause the performance of various interactive functions described in more detail below.

Display 208 can display text and, if configured to do so, graphical images, video, and the like. For example, in addition to displaying information identifying the station to which the device is tuned, Display 208 may also display information regarding the song playing, the artist playing the song, the duration of the song, etc.

The hardware utilized to fabricate the handheld mobile terminal device can comprise off-the-shelf components, many of which are already found in a standard cellular telephone. By constructing a simple device as shown in FIG. 2, and controlling the operation of the device as described herein with software, the benefits of this embodiment of the present invention are achieved.

The broadcasting by the cellular tower 110 to the hand-held mobile terminal devices 114, 116, and 118 can be accomplished in several ways. For example, in one embodiment, a standard cellular radio receiver can be used which will allow a user of one of said hand-held mobile terminal devices to "tune" to various RF channels. This allows the cellular transmitter to transmit over several RF channels, increasing the bandwidth available to the user of the hand-held mobile terminal device. This makes maximal use of existing technology (e.g., existing cellular radios, for example) but potentially makes the hand-held mobile terminal device more complicated and expensive than it needs to be. In an alternative embodiment, a single fixed RF channel can be utilized for the Internet radio broadcasts to the hand-held mobile terminal devices. While the bandwidth available will be limited to that single RF channel, for a user who only wishes to have limited access to local transmissions, the limited bandwidth available by using a single fixed RF channel may be perfectly acceptable. Further, by using a fixed RF channel, the hand-held mobile terminal device will be pre-tuned to the appropriate channel regardless of the city or locale in which the radio is situated, simplifying operation for the user.

For a fixed-channel arrangement, a user of one of the hand-held mobile terminal devices simply turns on the device and receives the cellular radio broadcast channel automatically, since it is preset to receive the dedicated radio broadcast channel (if multiple channels are used, the user will have to tune to the desired channel first). Within the received channel, the user is able to switch between the several Internet "stations" being delivered via the channel. Selection between the various stations is made by changing IP addresses. Preferably, upon acquiring the signal from an active cell tower, the configuration message sent from the tower to the hand-held mobile terminal device will include available station information. Preferably, the user interface provides a brief description of the station as the user switches from one station to the next (e.g., station 1 might display as "Chicago Blues-WXYZ"). The hand-held mobile terminal device receives system configuration information including a list of available stations, spreading codes for each station, station summary information (call letters, content format, etc.), and associated IP addresses. The hand-held mobile terminal device is then able to be utilized without any further communication, e.g., transmissions, to the cell tower. Each cell tower presents its own changeable list of information to the receivers of its broadcasts.

If desired, standards can be adopted so that regardless of which cell tower is being communicated with, certain stations may always be reserved for certain kinds of content, e.g., stations 1-5 might always be designated for news, stations 6-10 might always be designated for sports, stations 11 and 12 might be designated for weather, etc. This simplifies the user's experiences even more and makes it more likely that they will find operating the device simple and enjoyable.

City 104 is exemplary of a larger city that has, in this example, three transmission nodes all logically connected to a single server 126. For example, a tower 120 transmits in a range approximated by the circle 121; a tower 122 transmits in a range approximated by circle 123; and tower 124 transmits in a range approximated by circle 125. Server 126 is coupled to all three transmission towers so that each are capable of delivering the same information to the various hand-held mobile terminal devices 128, 130, 132, 134, and 136 that are within range of the various towers. In terms of content delivery, the system is identical to that illustrated with respect to city 102.

The cellular base stations or towers are analogous to a radio tower in a traditional radio system and, as noted above, preferably utilize a single assigned channel to deliver the radio content. The content transmitted is specific to the particular tower or towers with which the content server is associated and thus is capable of transmitting the content to receiving devices within their coverage area.

In a cellular system such as described, the data rate is limited by the number of available channels. 3G WCMDA systems can broadcast with more "stations" per tower because of the broader bandwidth available through the channel.

In the system described in FIG. 1, a station owner could lease one RF band channel on a cellular radio tower. This would enable the station owner to broadcast several "stations". Each station would have a unique spreading code. As described above, information is passed from the base station to all the hand-held mobile terminal devices in the area providing information on what spreading codes are used and what stations are associated with the codes. This can be passed over a common control channel, much like as is done in the normal operation of cell phones, where the control channels are used to provide system information and also to send signaling messages (i.e., incoming call) to the mobile telephones.

Once the receiving devices receive the information, an interface (such as a GUI or other interface mechanism) allows the user to "tune" the radio to different stations. When the user selects a station, the receiver despreads the received signal with the specific code that is associated with the desired content.

In the system of FIG. 1, the content provider can lease a tower (or multiple towers) to cover a desired geographic area. The content provider has a server that provides the data streams to the tower(s) using, for example, standard data networking technology.

As noted above, the present invention also allows transmission of certain information, e.g., commands, from the receiving device back to the cellular transmission tower. In cellular telephone systems, an uplink channel is a channel shared by all subscribers dedicated solely for uplink activities and is typically used to request call set-up for mobile initiated calls. This use of uplink commands in this embodiment of the present invention allows the system to be interactive. The user of the hand-held mobile terminal device can, for example, express interest in a song, artist, commercial, etc. by pressing a button on the hand-held mobile terminal device (e.g., the interactive function button 216 of FIG. 2 or a GUI button displayed on the hand-held mobile terminal device). For example, during the playing of a song, the user can press interactive function button 216 which is interpreted by the system as the user expressing interest in the song. The system reacts by sending email to the user providing pertinent information, for example, the name of the CD and where it can be purchased at a local store, a coupon for purchase, venues where the band singing the song will be playing and where tickets may be purchased, and the like. Implementing this aspect of this embodiment of the present invention involves creating or modifying software code to create the various specific messages and facilitate the control functions designated by the user of the handheld device.

Figure 3:
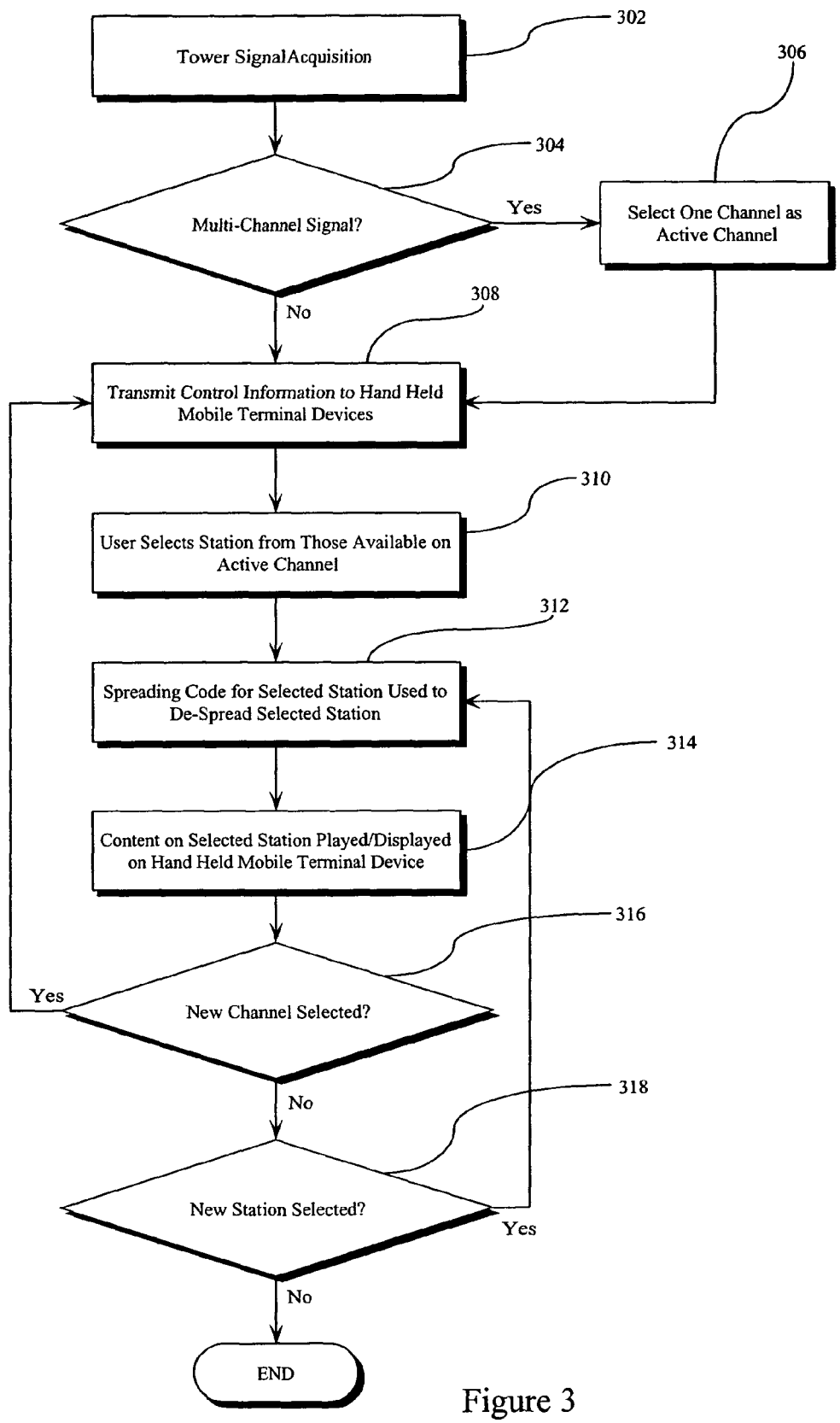
FIG. 3 is a flowchart illustrating an example of the basic steps performed during operation of the present invention.

FIG. 3 is a flowchart illustrating an example of the basic steps performed in accordance with one embodiment of the present invention. It is understood that all steps are not required and that additional steps may be included and still fall within the scope of the present invention. Referring to FIG. 3, at step 302, a hand-held mobile terminal device comes into range of a cellular tower configured to provide Internet radio as described above, thereby acquiring the tower signal. At step 304, a determination is made as to whether or not it is a multi-channel signal or a single channel signal. If it is determined that a multi-channel signal is being delivered by the cellular tower, then at step 306, one of the channels is selected, for example, by selection of a keypad setting by the user of the hand-held mobile terminal device. The process then proceeds to step 308.

If, at step 304, it is determined that a single channel signal is being delivered by the cellular tower, the process proceeds directly to step 308, where control information is transmitted to the hand-held mobile terminal device. At step 310, the user selects a station from those available on the active channel by, for example, making a selection on the keypad. At step 312, the spreading code for the selected station from the channel so that the content may be played/displayed on the hand-held mobile terminal device (step 314).

At step 316, a determination is made as to whether or not a new channel has been selected. This would occur, for example, in a multi-channel system where the user wishes to go to a different channel than the one currently selected. If it is determined that a new channel has been selected, then the process proceeds back to step 308 where the control information for the new channel is transmitted to the hand-held mobile terminal device and the process proceeds as above. If, at step 316, it is determined that a new channel has not been selected, the process queries the system to see if a new station has been selected. If, at step 318, it is determined that a new station has been selected, then the process proceeds back to step 312 where the spreading code for the selected station is used to despread the selected station and the process proceeds as above. Steps 316 and 318 continue to be asked until a determination is made that the user no longer wishes to use the system, at which case the process ends.

Figure 4:
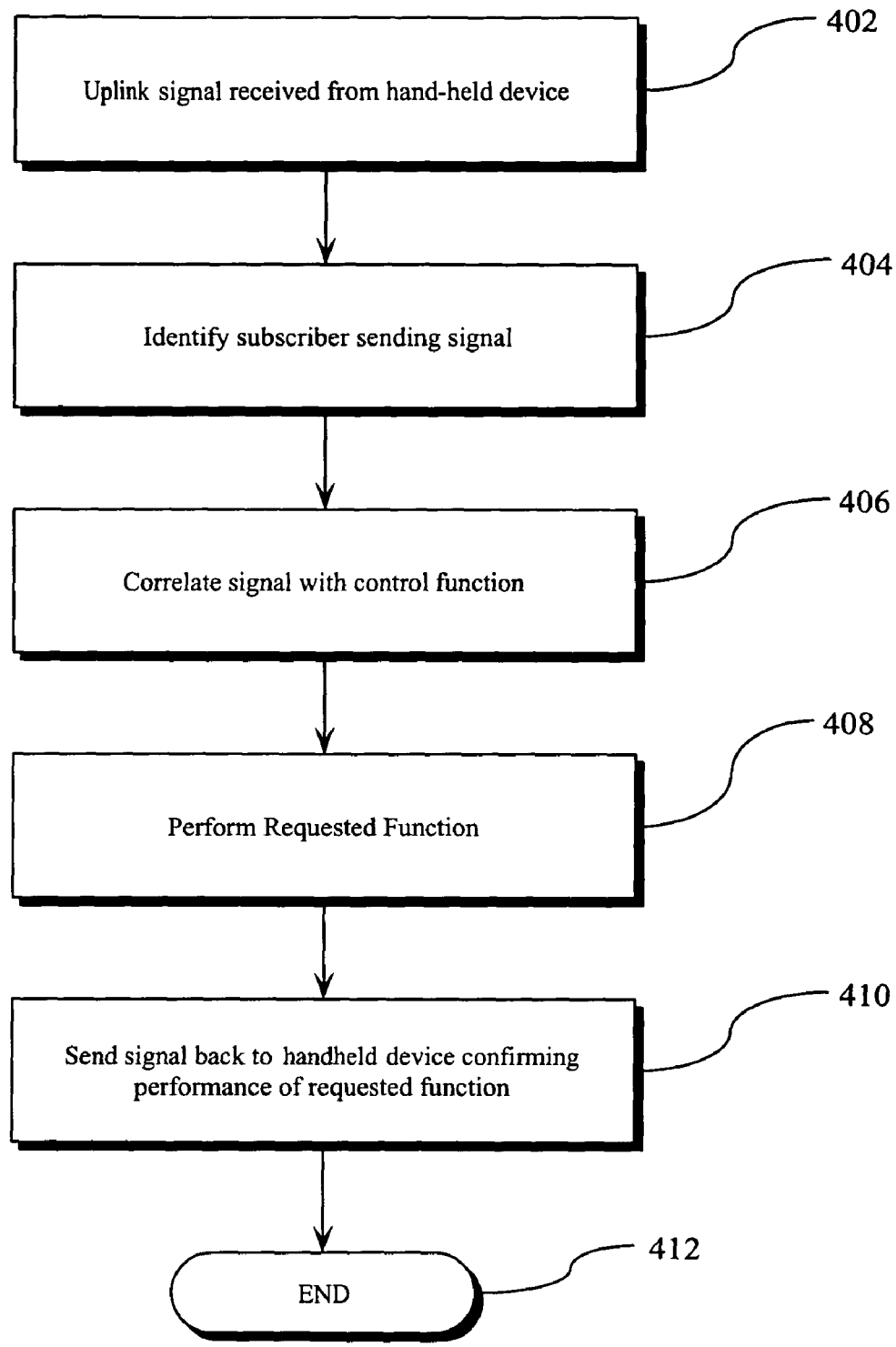
FIG. 4 is a flowchart illustrating an example of steps performed when a user of the present invention activates the interactive function button.

FIG. 4 illustrates an example of steps performed, in accordance with one embodiment of the present invention, when a user of a hand-held mobile device of one embodiment of the present invention activates the interactive function button 216 illustrated in FIG. 2. At step 402, the uplink signal is received from the hand-held device, triggered by activation of the interactive function button. Among the information transmitted with the uplink signal is information identifying the subscriber (step 404). This will allow the station owner to associate the request with that user so that, for example, requested information resulting from the activation of the button can be delivered to the correct subscriber.

At step 406, the uplink signal is correlated with the control function with which it is associated. The uplink signal can be a single signal that triggers a single function (e.g., there is only one function associated with the activation of the interactive function button); it can be a single signal that activates a particular function dependent upon the timing of the activation (e.g., if activated during a song it might tag the song for identification to the subscriber by a subsequent email; if activated during a commercial it might send the subscriber information about the advertised product or service, etc.); it can be multiple signals, selected from a dropdown list, each of which triggers the performance of a different function (e.g., one selection might tag a song for subsequent identification; another might ask for concert information regarding the performer of a song playing; another might request a set list of all songs played in the last hour, etc.). Any information available to the station owner that can be requested by the subscriber can be provided, simply by programming a processor controlled by the station owner to provide the information requested.

At step 408, the requested function is performed. If desired, at step 410, a signal is sent back to the subscriber, confirming that the requested function has been performed (or indicating a failure of the performance, if appropriate). At step 412, the process is completed.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a hand-held mobile terminal device. In a client/server environment, such software programming code may be stored with storage associated with a server.

The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions. These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-2 support combinations of means for performing the specified functions, combinations of steps for performing the specified functions, and program instruction means for performing the specified functions.

It is understood that a typical cellular telephone contains the necessary control elements needed to enable the reception and control of Internet radio broadcasts in accordance with the present invention and can do so if software is loaded thereon, in accordance with the above-described method, to allow such reception and control. It is also understood that in a preferred embodiment, a specialized device designed for reception and playback of the Internet radio broadcasts can be fabricated, to provide for higher quality service (e.g., better speakers for audio playback; specialized control elements such as volume controls, tuning controls, etc.) when it is being used for reception and playback of such broadcasts. Fabrication of a specialized device capable of maximizing the Internet radio experience for the user are well within the knowledge of skilled artisans, in view of the disclosure herein.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method of broadcasting, comprising:
   a wireless connection node receiving first content originating from a first content source and second content originating from a second content source;
   the wireless connection node spreading the first content using a first spreading code and the second content using a second spreading code; and
   the wireless connection node broadcasting the first and second spreading codes and the spread first and second content, wherein a plurality of receivers configured (i) to receive the spread first and second content and the first and second spreading codes and (ii) to despread a selected one of the spread first and second content using a corresponding one of first and second spreading codes may play to a plurality of users the selected one of the first and second content.

2. The method of claim 1, wherein said broadcasting step comprises at least the steps of:
   transmitting the spread first and second contents over one or more channels; and
   subdividing the one or more channels so that plural content elements are provided on plural sub-channels within the one or more channels.

3. The method of claim 1,
   wherein each of said first and second contents is selected by an operator of the wireless connection node independent of the users and independent of any preference of the users.

4. The method of claim 3,
   wherein each of said first and second contents comprises a data stream constituting an Internet radio station webcast.

5. The method of claim 1 wherein each of said first and second contents comprises only content that is local to the proximity of the connection-node.

6. The method of claim 1, wherein each of said first and second contents comprises only content of a particular content type.

7. The method of claim 1, wherein each of said first and second contents comprises only content of a particular type and that is local to the proximity of the connection node.

8. The method of claim 1, wherein said receivers are configured specifically for reception of only said first and second contents.

9. The method of claim 1, wherein said receivers include uplink capability, further comprising the step of:
   sending an uplink signal from at least one of said receivers to said wireless connection node to enable at least one of said users to communicate with said wireless connection node.

10. The method of claim 1, further comprising the step of:
    configuring said wireless connection node to receive said uplink signal and, based upon said signal, perform a function desired to be performed by said at least one of said users.

11. The method of claim 1,
    wherein the content available to each receiver is pre-specified based on the wireless connection node whose transmission the receiver receives.

12. The method of claim 1, wherein the content available to each receiver is pre-specified based solely on the wireless connection node whose transmission the receiver receives, such that no determination of the user's current geographic location is required before the delivered content is transmitted.

13. The method of claim 1, wherein the first content and the second content comprise information specific to a geographically defined receiving area comprising the wireless connection node.

14. The method of claim 1, wherein the first and second contents are digital streaming media signals, and the first and second content sources are digital streaming media servers.

* * * * *